US010288743B2

(12) United States Patent
Rapoport

(10) Patent No.: US 10,288,743 B2
(45) Date of Patent: May 14, 2019

(54) ADAPTIVE GNSS POSITIONING METHOD CAPABLE OF ADJUSTING TO IONOSPHERIC DELAY

(71) Applicant: Topcon Positioning Systems, Inc., Livermore, CA (US)

(72) Inventor: Lev Borisovich Rapoport, Moscow (RU)

(73) Assignee: Topcon Positioning Systems, Inc., Livermore, CA (US)

( * ) Notice: Subject to any disclaimer, the term of this patent is extended or adjusted under 35 U.S.C. 154(b) by 417 days.

(21) Appl. No.: 15/316,171

(22) PCT Filed: Aug. 15, 2016

(86) PCT No.: PCT/RU2016/000544
§ 371 (c)(1),
(2) Date: Dec. 4, 2016

(87) PCT Pub. No.: WO2018/034580
PCT Pub. Date: Feb. 22, 2018

(65) Prior Publication Data
US 2018/0188378 A1    Jul. 5, 2018

(51) Int. Cl.
*G01S 19/40* (2010.01)
*G01S 19/43* (2010.01)

(52) U.S. Cl.
CPC .............. *G01S 19/40* (2013.01); *G01S 19/43* (2013.01)

(58) Field of Classification Search
CPC ................................ G01S 19/40; G01S 19/07
See application file for complete search history.

(56) References Cited

U.S. PATENT DOCUMENTS

| 5,867,411 A * | 2/1999 | Kumar ................ G01S 19/07 |
| | | 375/232 |
| 8,451,167 B2 | 5/2013 | Rollet et al. |
| 2004/0135721 A1 | 7/2004 | Hoven et al. |
| 2007/0067073 A1* | 3/2007 | Hsu .................... G01S 19/07 |
| | | 701/13 |

FOREIGN PATENT DOCUMENTS

| WO | 2007/032947 A2 | 3/2007 |
| WO | 2011/100680 A2 | 8/2011 |

OTHER PUBLICATIONS

C. Zhu et al., Journal of Geodesy and Geodynamics, vol. 35(1), p. 81-86, Feb. 2015 (Year: 2015).*
Search Report in PCT/RU2016/000544, dated Feb. 4, 2016.

* cited by examiner

*Primary Examiner* — Bernarr E Gregory
*Assistant Examiner* — Fred H Mull
(74) *Attorney, Agent, or Firm* — Bardmesser Law Group

(57) ABSTRACT

A plurality of GNSS satellite signals feeds the signal processing engine operating in certain processing mode including carrier phase smoothed pseudorange positioning, precise point positioning (PPP), pseudorange differential (DGNSS), and carrier phase differential (RTK). The processing engine calculates two estimates of the ionosphere delay for each satellite: the filtered delay and the instant delay. Comparison of them allows to detect turbulent variation of the ionosphere and adjust parameters of two-parametric dynamic mode which improves positioning precision.

8 Claims, 3 Drawing Sheets

ADAPTIVE GNSS POSITIONING METHOD CAPABLE OF ADJUSTING TO IONOSPHERIC DELAY

BACKGROUND OF THE INVENTION

Field of the Invention

The present invention relates to a satellite navigation systems, and, more particularly, to more accurate determination of ionospheric delays in satellite navigation signals using an adjustable dynamic model.

Description of the Related Art

Assume that the receiver is capable of receiving multiple GNSS signals of multiple GNSS satellites, including (but not limited by this set)
GPS L1, L2, L5;
Galileo L1, L2, E5a, E5b;
QZSS L1, L2, L5, E6;
GLONASS L1, L2, L3;
BEIDOU B1, B2, B3.

The number of such signals can exceed several dozen. The following fundamental set of observables is used:

$$P_{k,b}^p(t) = \rho_k^p(t) + cdt_k(t) - cdt^p(t) + \quad (1)$$
$$\left(\frac{f_{L1}^p}{f_b^p}\right)^2 I_{k,L1}^p(t) + T_k^p(t) + d_{k,b,P} + M_{k,b,P}^p - D_{b,P}^p + \varepsilon_{k,b,P}^p(t)$$

$$\varphi_{k,b}^p(t) = \frac{f_b^p}{c}\rho_k^p(t) + f_b^p dt_k(t) - f_b^p dt^p(t) + N_{k,b}^p(t_{CS,k,b}^p) - \quad (2)$$
$$\frac{1}{c}\frac{(f_{L1}^p)^2}{f_b^p} I_{k,L1}^p(t) + \frac{f_b^p}{c} T_k^p(t) + d_{k,b,\varphi} + M_{k,b,\varphi}^p - D_{b,\varphi}^p + \varepsilon_{k,b,\varphi}^p$$

where the following notations are used (see [1, Chapter 6, 7]):
k is the index of the station;
p is the number of the satellite (out of K total satellites from which signals are received). It is assumed that all satellites available for tracking in the receiver station k are ordered and this ordering number includes the satellite system. For example, satellites with numbers from 1 to 5 are GPS, satellites with numbers from 6 to 11 are GLONASS, satellites with numbers from 12 to 15 are BEIDOU, etc.;
b is the frequency band (for example L1, LP2, L2C, L5, E6, B1, and so on);
(p,b) the pair of indices indicating the signal of the satellite p at the frequency band b;
t is the current time; the term 'epoch' is also used to denote the current discrete time instant;
c is the light speed;
$f_b^p$ is the frequency of the signal corresponding to the satellite p and the frequency band b;
$dt_k(t)$ is the current clock bias of the station k;
$dt^p(t)$ is the current clock bias of the satellite p;
$I_{k,b}^p(t)$ is the ionospheric delay affecting the signal (p,b) received by the station k. Thus $I_{k,L1}^p(t)$ is related to the L1 band. Basically, the ionospheric delay depends on the position of the station, position of the satellite, frequency of the signal, and the total electronic content (TEC) corresponding to the time instant t;
$T_k^p(t)$ is the tropospheric delay. In contrast to the ionospheric delay it doesn't depend on the signal frequency and is called 'non-dispersive' delay.
$P_{k,b}^p(t)$ and $\varphi_{k,b}^p(t)$ are pseudorange and phase measurements respectively;
$M_{k,b,P}^p$ and $M_{k,b,\varphi}^p$ are code and phase multipath, affecting pseudorange and carrier phase measurements respectively;
$N_{k,b}^p(t_{CS,k,b}^p)$ carrier phase ambiguity corresponding to the signal (p,b) received by the station k. Note that it corresponds to the last detected cycle slip and therefore it explicitly dependents on the time instant $t_{CS,k,b}^p$, when the cycle slip was detected. The carrier phase ambiguity remains unchanged until the cycle slip occurs.
$\rho_k^p(t)$ is the true topocentric range between the satellite and the receiver station. The measurement equations (1) and (2) relate this quantity with pseudorange and carrier phase observables, respectively;
Quantities $D_{b,\varphi}^p$, $D_{n,P}^p$, $\varepsilon_{k,b,P}^p(t)$ and $\varepsilon_{k,b,\varphi}^p$ denote hardware biases and noise. D stands for satellite-related bias, while d denotes the receiver-related bias. Biases reflect a systematic hardware component of the measurement error. They are constant or slow varying, in contrast to the noise component of the error having the stochastic nature. Satellite position error is part of the slow varying bias. It is also called 'the ephemerides' error.

Thus, the receiver position is measured by the pseudorange and carrier phase observables for the plurality of satellites. Error components, including biases and noise, affecting the observable equations (1) and (2), prevent a direct solution for the receiver antenna position.

Carrier phase measurements are much more precise, compared to the pseudorange measurements, since the carrier phase noise has standard deviation in the centimeter or even millimeter range, while the standard deviation of the pseudorange measurements is usually of the meter or decimeter range. On the other hand, the carrier phase measurement is affected by the carrier phase ambiguity, which is an unknown integer valued quantity.

Thus, elimination of measurement errors is necessary for precise positioning. To achieve a high precision in position determination, different methods of errors mitigation are applied. For example, tropospheric errors can be precisely modeled and compensated in observables of equations (1) and (2). Ionospheric errors can be estimated along with other unknowns. Noise is easily filtered.

Errors common to two receivers, like clock and hardware biases of the satellite, can be compensated in a difference between two receivers. Usually one of receivers occupies a known position, while an antenna of another receiver is attached to the object to be located. The first receiver is called 'the base' while another receiver is called 'the rover'. The processing mode involving calculation of the across-receiver difference (also called the 'first difference') is referred to as differential GNSS processing or DGNSS. The DGNSS processing is performed in real time and includes not only pseudoranges but also carrier phase observables, and is referred to as real time kinematic (RTK) processing.

Another sources of errors partially eliminated by across-receiver differences are ionospheric delay and ephemerides error. The closer the rover is to the base, the better is compensation of the ionospheric and ephemerides error.

For two stations k and l the across-receiver differences of pseudorange and carrier phase measurements can be written as $$\overline{P}_{kl,b}^{p}(t) = \rho_{k}^{p}(t) - \rho_{l}^{p}(t) + cdt_{kl}(t) + \left(\frac{f_{L1}^{p}}{f_{b}^{p}}\right)^{2} I_{kl,L1}^{p}(t) + d_{kl,b,P} + \bar{\varepsilon}_{kl,b,P}^{p}(t), \quad (3)$$

$$\overline{\varphi}_{kl,b}^{p}(t) = \frac{1}{\lambda_{b}^{p}}(\rho_{k}^{p}(t) - \rho_{l}^{p}(t)) + f_{b}^{p} dt_{kl}(t) + \quad (4)$$

$$N_{kl,b}^{p}(t_{CS,kl,b}^{p}) - \frac{1}{\lambda_{b}^{p}}\left(\frac{f_{L1}^{p}}{f_{b}^{p}}\right)^{2} I_{kl,L1}^{p}(t) + d_{kl,b,\varphi}^{p} + \bar{\varepsilon}_{kl,b,\varphi}^{p},$$

Another way for error mitigation includes using a precise satellites clock and precise ephemerides. They are available through a dedicated real time service. Precise point positioning (PPP) allows to achieve the centimeter level position with only one rover receiver, provided satellite clock and precise satellite position are available. The base station is not necessary in this case.

Finally, if neither base station, nor precise clock and ephemerides are available, the quality of the standalone position can be improved if carrier phase ambiguity and ionospheric delay are estimated, along with position, using broadcast ephemerides. The corresponding processing mode is equivalent smoothing of pseudoranges using carrier phase measurements or, in short, carrier phase smoothing of code pseudoranges, see [2]. Whatever processing mode is used, the linearization and filtering algorithms are used for recursive estimation of unknown position, carrier phase ambiguity, and ionospheric delay.

The general form of the linearized navigation model has the following form (see [1, Chapt. 7])

$$b_P(t) = Adx(t) + e\xi(t) + \Gamma i(t) + d_P \quad (5)$$

$$b_\varphi(t) = \Lambda^{-1} A dx(t) + \Lambda^{-1} e\xi(t) + n - \Lambda^{-1} \Gamma i(t) + d_\varphi \quad (6)$$

Two last quantities are undifferences for carrier phase smoothing and PPP processing modes. For DGNSS and RTK processing modes the carrier phase ambiguity and ionospheric delay are across-receiver differenced.

Let n be total number of satellite signals, including different satellite systems, different satellites, different frequency bands.

In the following description, all vectors are represented by columns, and the superscript symbol $^T$ denotes the matrix transpose. $R^N$ is the N-dimensional Euclidean space. Given a linearization point $x_0(t) \in R^3$, notations used in equations (5) and (6) are as follows:

$b_P(t) \in R^n$ is the n-dimensional vector of pseudorange residuals calculated at the linearization point;

$b_\varphi(t) \in R^n$ is the n-dimensional vector of carrier phase residuals calculated at the linearization point;

$e = (1, 1, \ldots, 1)^T \in R^n$ is the vector consisting of all "ones";

$dx(t) \in R^3$ is the correction to the linearization point. Thus, the corrected position is calculated as $x(t) = x_0(t) + dx(t)$;

$\xi(t)$ is the arbitrary varying rover clock shift; it is undifferenced for the standalone and PPP processing modes, and it is across-receiver differenced in the DGNSS and RTK processing modes;

$\Lambda$ is the n-dimensional diagonal matrix with wavelengths $\lambda_b^p = c/f_b^p$ in the main diagonal. Each wavelength corresponds to the specific signal (p,b);

A is the n×3 matrix of directional cosines;

$\Gamma$ is the n×n diagonal matrix with quantities $(f_{L1}^p/f_b^p)^2$ in the main diagonal;

$i(t) \in R^n$ is the vector of ionospheric delays related to the L1 frequency band. Ionospheric delays are undifferenced for the standalone and PPP processing modes, and they are across-receiver differenced in the DGNSS and RTK processing modes;

$n \in R^n$ is the vector of carrier phase ambiguities related to the L1 frequency band. Ambiguities are undifferenced for the standalone and PPP processing modes, and they are across-receiver differenced in the DGNSS and RTK processing modes;

$d_P \in R^n$ and $d_\varphi \in R^n$ are vectors of pseudorange and carrier phase receiver hardware biases.

Consideration of pseudorange hardware biases leads to a necessity to consider the plurality of signals the receiver is able to track. In the case of a multi-frequency and multi-system receiver supporting the following bands:

L1, L2 and L5 bands for GPS,
L1 and L2 GLONASS,
L1, E5a, E5b and E6 Galileo,
L1, L2, L5 and E6 QZSS,
L1 an, L5 SBAS,
B1, B2, and B3 Beidou, the signals (L1 GPS, L1 Galileo, L1 SBAS, L1 QZSS), (L2 GPS, L2 QZSS), (L5 GPS, E5a Galileo, L5 SBAS, L5 QZSS), (E6 Galileo, E6 QZSS), respectively, can share the same hardware channel and therefore will be affected by the same hardware bias, as noted in [1, Chapter 7]. Note that the biases vector $d_P$ and the clock shift variable $\xi(t)$ appear as a sum in equation (5). This means that one of the biases, say $d_{L_1,G/E/S/Q,P}$, can be combined with $\xi(t)$, while others can be replaced with their difference with $d_{L_1,G/E/S/Q,P}$. Thus, new bias variables appear:

$$\eta_1 = d_{L_2,G/Q,P} - d_{L_1,G/E/S/Q,P}, \eta_2 = d_{L_1,R,P} - d_{L_1,G/E/S/Q,P},$$
$$\eta_3 = d_{L_2,R,P} - d_{L_1,G/E/S/Q,P}$$

$$\eta_4 = d_{L_5,G/E/S/Q,P} - d_{L_1,G/E/S/Q,P}, \eta_5 = d_{E_{5b},E,P} - d_{L_1,G/E/S/Q,P}, \eta_6 = d_{E_6,E/Q,P} - d_{L_1,G/E/S/Q,P}$$

$$\eta_7 = d_{B_1,B,P} - d_{L_1,G/E/S/Q,P}, \eta_8 = d_{B_2,B,P} - d_{L_1,G/E/S/Q,P},$$
$$\eta_9 = d_{B_3,B,P} - d_{L_1,G/E/S/Q,P} \quad (7)$$

This representation can be referred to as establishing a bias datum.

In one possible embodiment, the linearized equations (5) can now be expressed in the form $$b_P(t) = Adx(t) + e\xi(t) + \Gamma i(t) + W_\eta \eta \quad (8)$$

The bias vector $\eta$ has the appropriate dimension $m_\eta$. Note again that in this exemplary embodiment we follow notations introduced in [1], which is incorporated herein by reference in its entirety.

The bias vector $\eta$ is three-dimensional ($m_\eta = 3$) for dual-band and dual-system GPS/GLONASS receivers, as only biases $\eta_1$, $\eta_2$, $\eta_3$ are presented among all possible biases listed in (7). In the case of the multi-band, multi-system receiver, the dimension of the vector $\eta$ can be large. It is one-dimensional in the case of dual-band GPS-only receivers or single band GPS/GLONASS receivers.

The $W_\eta$ is referred to as bias allocation matrix and has dimensions $n \times m_\eta$. It allocates a single bias, or none, to a certain signal. No bias is allocated to the signal corresponding to the GPS, Galileo, SBAS, or QZSS systems and b=L1 because we combined the bias $d_{L1,G/E/S/Q,P}$ with the clock bias $\xi(t)$. In this case, the row of $W_\eta$ consists of zeroes.

Consider, for example, a dual-band GPS/GLONASS receiver. Suppose it tracks six GPS satellites and six GLONASS satellites. The total number of dual-band signals is 24. Let the signals be ordered in the following way: six GPS L1, six GPS L2, six GLONASS L1, and six GLONASS L2 signals. The biases allocation matrix presented in the linearized single difference pseudorange equation (8) takes the following form:

$$W_\eta^T = \begin{bmatrix} 0 & 0 & 0 & 1 & 1 & 1 & 0 & 0 & 0 & 0 & 0 & 0 \\ 0 & 0 & \vdots & 0 & 0 & 0 & \vdots & 0 & 1 & 1 & \vdots & 1 & 0 & 0 & \vdots & 0 \\ 0 & 0 & 0 & 0 & 0 & 0 & 0 & 0 & 0 & 1 & 1 & 1 \end{bmatrix} \quad (9)$$

Further, the real-valued carrier phase ambiguities (also called float ambiguities) are combined with biases $d_\varphi$), while pseudorange biases are considered as a real valued constant unknown parameter. Thus, after combination of carrier phase ambiguities with carrier phase biases, the equation (6) takes the form $$b_\varphi(t) = \Gamma^{-1} A dx(t) + \Gamma^{-1} e\xi(t) + n - \Lambda^{-1} \Gamma i(t) \quad (10)$$

Note that the noise component is omitted in equations (8), (10) for the sake of brevity.

Accordingly, there is a need in the art for a more accurate determination of phase to, thereby, enable more accurate determination of position.

SUMMARY OF THE INVENTION

Accordingly, the present invention is directed to automatic adjusting of parameters of the ionosphere dynamic model to the current state of the ionosphere in order to achieve better precision of positioning in the following processing modes:

Standalone with carrier phase smoothing of pseudoranges,
PPP,
DGNSS,
RTK.

The same ionosphere delay and carrier phase ambiguity described above is used in all processing modes. Adaptive adjustment of parameters is performed after the recursive update step according to the equation (19) (described in the following text) is performed.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF EMBODIMENTS OF THE INVENTION

Figure 1:
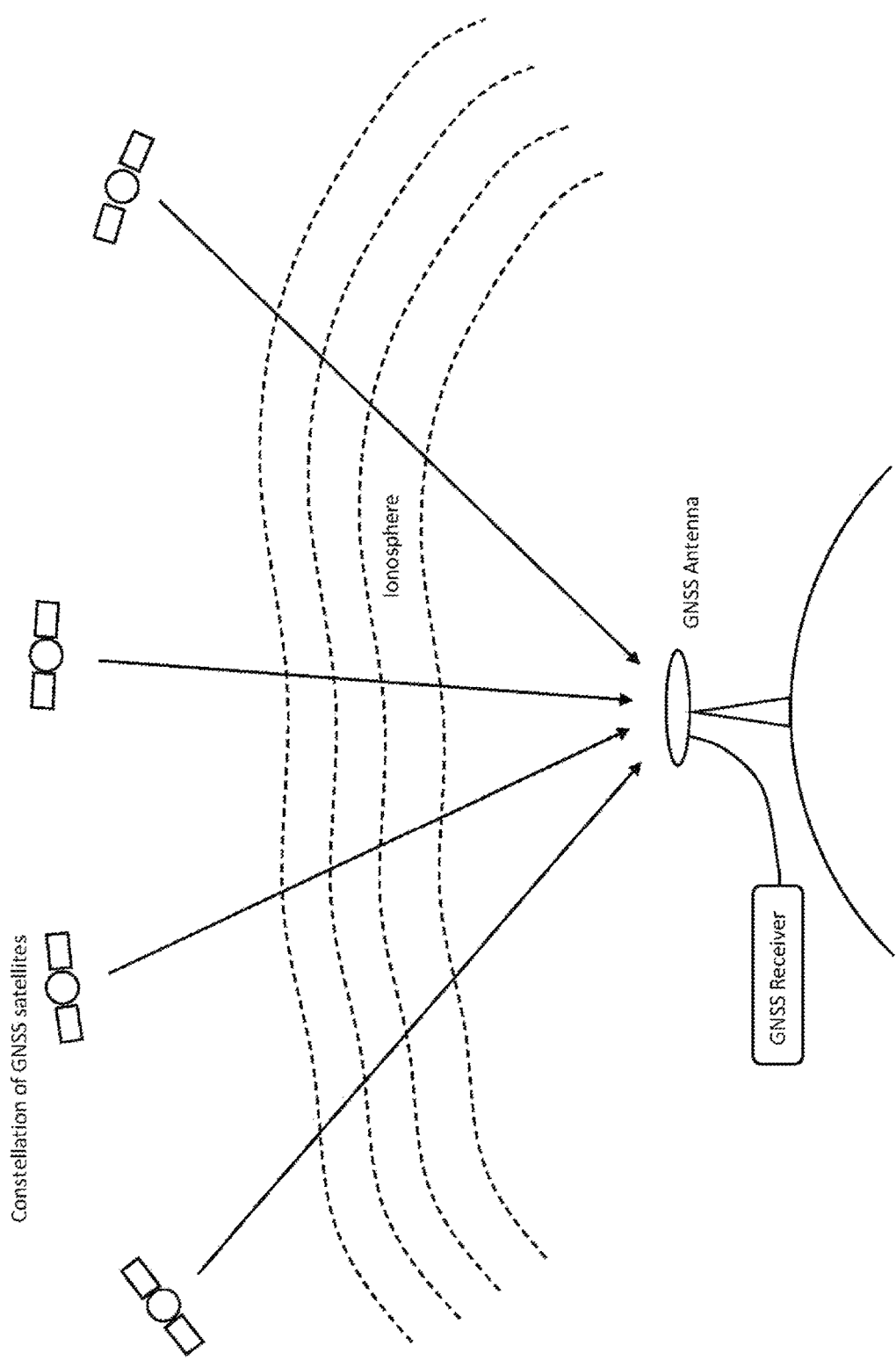
FIG. 1 illustrates constellation of GNSS satellites, the GNSS antenna and receiver, and signals travelling from satellites to the antenna through the ionospheric layer.

Reference will now be made in detail to the embodiments of the present invention, examples of which are illustrated in the accompanying drawings.

The vector of ionospheric delays i(t) is supposed to be slow varying. Its time variation is subjected to a certain dynamic model. To specify the dynamic model that governs variation of i(t) let us suppose that time variation of the vector i(t) is restricted by equations $$i^p(t) = \gamma_i i^p(t-1) + \varepsilon_i(t) \quad (11)$$

where $$\gamma_i = e^{-\frac{\Delta t}{\tau_i}} \quad (12)$$

with $\Delta t$ being the across-epoch time difference, and $\tau_i$ being the time constant reflecting the rate of variation of the ionospheric delay in time. A typical value for $\tau_i$ is 600-1800 seconds, provided no ionospheric disturbances and scintillation occurs. Otherwise, if detection criteria described below indicate a presence of fast variation of ionosphere (more precisely, a variation of content of charged particles, or total electron content (TEC) in the ionosphere), the instant value of $\tau_i$ can be temporary scaled down until the fast variations end. Moreover, the algorithm presented here is able to adaptively adjust the constant $\tau_i$ to the rate of real variation of the ionosphere state.

The white noise $\varepsilon_i(t)$ has a variance $\sigma_i^2$ which provides the variance of the resulting ionosphere delay generated by the difference equation (11). For the case of RTK and DGNSS processing modes the resulting residual across-receiver delay is supposed to satisfy the condition $$\|i_p(t)\| \approx s \times 10^{-6} \times \|\text{baseline length}\| \quad (13)$$

with a certain scale factor s, which takes values of, for example, from 1 to 5, depending on the current solar activity (for a period with unusually high solar activity, a value of s up to 10 might be used). For the standalone and PPP processing modes it should satisfy the condition $$\|i^p(t)\| \approx s \times \sigma_{ref} \quad (14)$$

where $\sigma_{ref}$ is a certain reference value corresponding to the averaged state of the ionosphere, s is a scale factor having the same meaning as in (13).

It follows from (11) that $\|i^p(t)\|^2 = \|\gamma_i i^p(t-1) + \varepsilon_i(t)\|^2$. Then, assuming that the stochastic process $i^p(t)$ is stationary and $i^p(t)$ does not depend on $\varepsilon_i(t)$, we take a mean value of both sides of the last equality. We obtain $$\sigma_i^2 = (1-\gamma_i^2) \times (s \times 10^{-6} \times \|\text{baseline length}\|)^2 \quad (15)$$

or $$\sigma_i^2 = (1-\gamma_i^2) \times (s \times \sigma_{ref})^2 \quad (16)$$

depending on the processing mode. Having in mind application of the filtering scheme for estimation of variables listed in equations (8) and (10), let us define the measurement and dynamic models. The measurement model combines equations (8) and (10). The group of variables $\eta$ and $\eta$ form the vector $$y = \begin{pmatrix} \eta \\ n \end{pmatrix} \quad (17)$$

The group of arbitrary varying variables dx(t) and $\xi(t)$ form the vector $$\bar{x}(t) = \begin{pmatrix} dx(t) \\ \xi(t) \end{pmatrix} \quad (18)$$

The group of slow varying variables is arranged into the vector i(t) governed by the dynamic model (11). Then the estimation algorithm described in [1, Table 3.5.1 and Chapt. 7.6, 7.7] can be applied.

Taking into account notations (17) and (18) the recursive estimation algorithm takes the following form $$\begin{pmatrix} i(t+1) \\ y(t+1) \end{pmatrix} = \begin{pmatrix} \gamma_i i(t) \\ y(t) \end{pmatrix} + G_{iy} r'(t+1) \quad (19)$$

$$\bar{x}(t+1) = G_x(t+1) r''(t+1) \quad (20)$$

with $G_{iy}$ and $G_x$ being the matrix gain, r'(t+1) and r''(t+1) being the residuals of the linearized measurement equations (8) and (10) calculated before and after the update (19). The matrix gain is calculated according to the algorithm described in [1, Chapters 7.6, 7.7]. We present the full description here for the sake of completeness:

$$G_{iy} = (M^T)^{-1} M^{-1} \begin{pmatrix} H^T \\ W^T \end{pmatrix} \Pi \quad (21)$$

$$G_x = (L_J^T)^{-1} (L_J)^{-1} J^T \quad (22)$$

where:

$$J = \begin{bmatrix} e & A \\ \Lambda^{-1} e & \Lambda^{-1} A \end{bmatrix} \in R^{2n \times 4};$$

$J^T J = L_J L_J^T$, calculation of the Cholesky factorization;
$\Pi = I_{2n} - J(L_J^T)^{-1}(L_J)^{-1} J^T$;

$$W = \begin{bmatrix} W_\eta & 0 \\ 0 & I_n \end{bmatrix}, I_n$$

$I_n$ is the identity matrix, 0 is the zero matrix of the appropriate size;

$$H = \begin{bmatrix} \Gamma \\ -\Lambda^{-1}\Gamma \end{bmatrix};$$

$F = \gamma_i I_n;$ $Q = \sigma_i^2 I_n;$ $F = \gamma_i I_n;$
$Q = \sigma_i^2 I_n;$ To complete description, let us introduce the recursive scheme with the matrix $\hat{D}(t) \in R^{K+n_y}$ being recursively updated, $\hat{D}(0)=0$, $n_y$ is dimension of the vector y, $$\hat{D}(t) = \begin{bmatrix} D^{ii} & D^{iy} \\ D^{iyT} & D^{yy} \end{bmatrix} \quad (23)$$

$$\tilde{D}(t) = \begin{bmatrix} D^{ii} & 0 & D^{iy} \\ 0 & 0 & 0 \\ D^{iyT} & 0 & D^{yy} \end{bmatrix} \in R^{(2K+n_y) \times (2K+n_y)} \quad (24)$$

$$G(t+1) = \begin{bmatrix} D^{ii}+F^TF & -F^T & D^{iy} \\ -F & Q^{-1}+H^T(t+1)\Pi H(t+1) & H^T(t+1)\Pi W \\ D^{iyT} & W^T \Pi H(t+1) & D^{yy}+W^T \Pi W \end{bmatrix} \quad (25)$$

$$G(t+1) = \begin{bmatrix} L & 0 \\ K & M \end{bmatrix} \begin{bmatrix} L^T & K^T \\ 0 & M^T \end{bmatrix}, L \in R^{K \times K}, M \in R^{(n_y+K) \times (n_y+K)} \quad (26)$$

Last equation (26) defines the Cholesky factorization. Finally.

$$\hat{D}(t+1) = MM^T \quad (27)$$

The matrix M is used in equation (21).

Let us define also the filtering reset procedure. If for any reason the 'filtering reset' decision is taken at the time instant t+1, the matrix $\hat{D}(t)$ is set to zero:

$$\hat{D}(t) := 0 \quad (28)$$

which means that the filtering scheme is started from the scratch at the time instant t+1.

Let us define also the partial filtering reset procedure with the fading factor $\alpha < 1$. It means that the memory accumulated in the matrix $\hat{D}(t)$ is partially 'forgotten':

$$\hat{D}(t) := \alpha \hat{D}(t) \quad (29)$$

It should be noted that for the sake of brevity we omitted handling of covariance matrices of the pseudorange and carrier phase noise. Moreover, we omitted this noise component in the basic equations (5) and (6).

The main problem with application of this straightforward numerical scheme is that the two parameters $\tau_i$ and s presented in the in equations (11), (12), and (13), reflecting the current state of the ionosphere, are usually unknown. Moreover, the dynamic model (11) is applicable to the stationary, time invariant, "calm" state of the ionosphere. In practice, the ionosphere is subject to turbulence, which makes the model (11) with constant parameters $\tau_i$ and s inapplicable. The current invention deals with the adaptive algorithm being able to adjust variation of the model parameters to the time varying state of the ionosphere.

Assuming that constant parameters (17) are updated at the time instant t+1 by the recursive scheme (19), the current estimate of the ambiguity vector n(t+1) is available. Assuming that the number of satellites K is not less than 4, the number of frequency bands is not less than 2, and the number of signals n is not less than 8, the equation (10) can be solved with respect to the variables dx(t+1), $\xi(t+1)$, i(t+1). Let us denote these instant estimates by dx*(t+1), $\xi^*(t+1)$, i*(t+1). Then:

$$\begin{pmatrix} dx^*(t+1) \\ \xi^*(t+1) \\ i^*(t+1) \end{pmatrix} = (\overline{A}^T \overline{A})^{-1} \overline{A}^T (b_\varphi(t+1) - n(t+1)) \quad (30)$$

where $$\overline{A} = [\Lambda^{-1}A|\Lambda^{-1}e|-\Lambda^{-1}\Gamma] \quad (31)$$

Thus two estimates of the ionosphere delay vector i are available at the time instant t+1:

- The filtered estimate i(t+1) calculated through the update equation (19) taking into account the dynamic model (11) with parameters $\tau_i$ and s;
- The instant estimate i*(t+1) calculated based on instant carrier phase measurements and instant carrier phase ambiguity estimate n(t+1), not taking into account the dynamic model (11).

Comparison of these two estimates allows to judge whether the ionosphere model with currently used parameters $\tau_i$ and s is applicable. One of the criteria proposed in this discussion indicates that the parameter $\tau_i$ should be downscaled. Another criterion indicates that the parameter s should be increased or decreased.

A large body of literature is devoted to detection of fast variation of the ionospheric delays, mainly in connection with scintillation detection. The standard approach consists of analysis of time series for each satellites individually. Two criteria $S_4$ and $\sigma_\varphi$ (amplitude and phase scintillation indices, respectively) are used. Various decision rules, like Neyman-Pearson (see [2] and references cited therein) can be applied to generate binary criteria.

A well known approach to mitigation of the ionosphere delay consists in construction of the ionosphere-free combination (IFC) of pseudorange and carrier phase measurements (see for example [1]). An advantage of using IFC is that it allows for almost total rejection of the ionosphere delay. A disadvantage is that it does not take into account slow varying nature of the ionosphere delay. Moreover, using IFC increases sensitivity of the resulting position to the measurement's noise and errors of another nature. The method of adjusting parameters of IFC is considered in [3].

The approach described in the present discussion does not use time-series analysis for each satellite individually. Instead, it uses the criteria in which all satellites are involved simultaneously. It can be stated that the current invention uses the state space domain analysis instead of time domain analysis, allowing for instant detection of ionospheric turbulence. For the case of calm ionosphere, it allows to produce less noisy position, compared to IFC-based approaches. For the time varying turbulent ionosphere, it allows to adjust parameters of the dynamic model (11).

Figure 2:
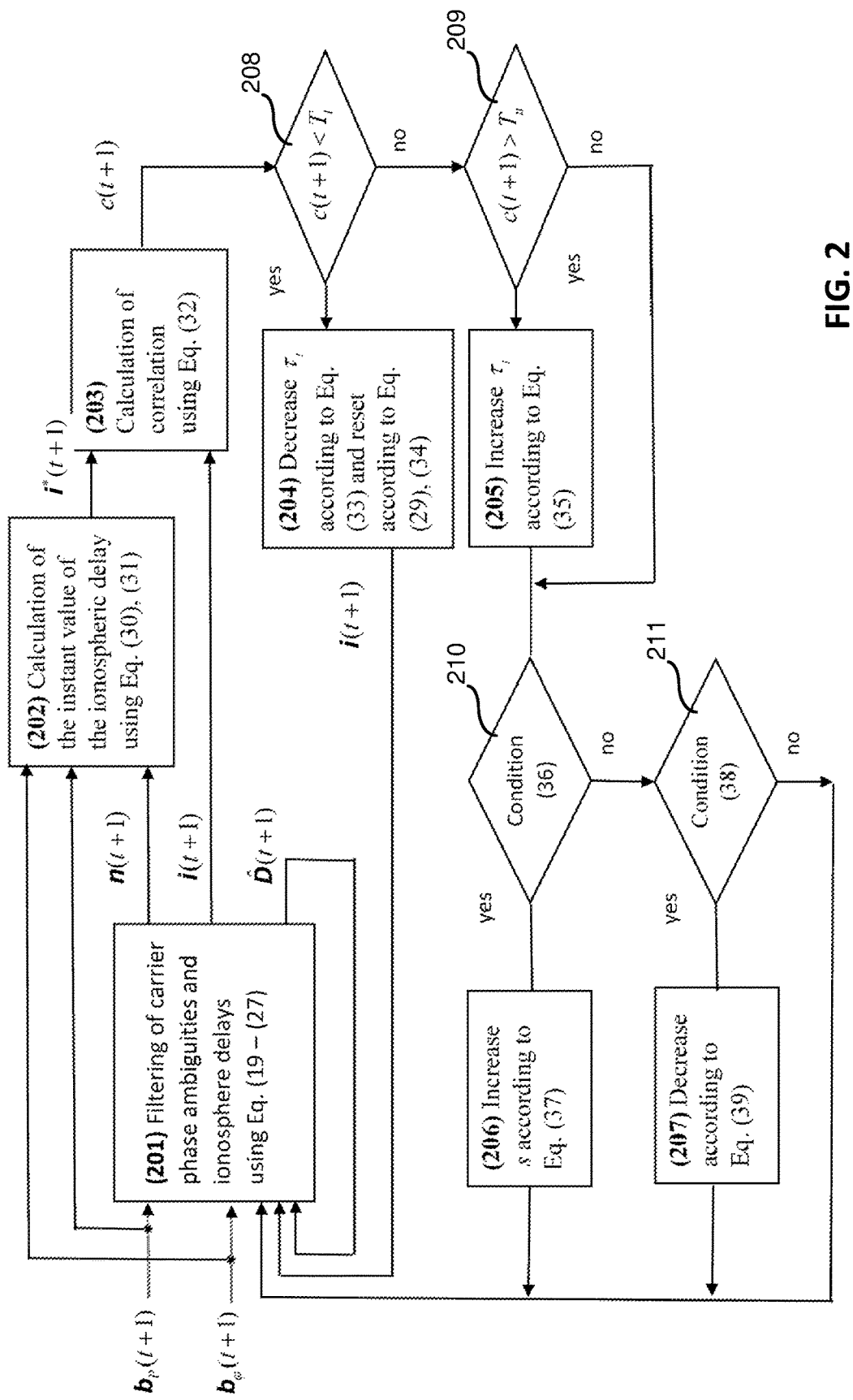
FIG. 2 illustrates algorithm of the adaptation of the time constant $\tau_i$. and the scale factor s.

FIG. 2 shows detailed flow chart of the proposed algorithm of adaptive adjustment of parameters $\tau_i$ and s. After filtering (see block 201), the instant ionospheric delay is calculated (see block 202). Having at hand two estimates i(t+1) and i*(t+1), the correlation coefficient between them is calculated as (see block 203):

$$c(t+1) = \frac{\langle i(t+1), i^*(t+1) \rangle}{\|i(t+1)\| \|i^*(t+1)\|} \quad (32)$$

where $\langle a, b \rangle$ denotes the scalar product of the two vectors a and b; $\|a\|$ denotes the Euclidean norm of the vector a. Both vectors i(t+1) and i*(t+1) have the dimension K, i.e., the number of satellites.

A high correlation between two estimates (see block 208) means that the parameter $\tau_i$ is most likely chosen correctly and there is no need to change it (see block 209). Otherwise, a low value of the correlation coefficient c(t+1) (less than the threshold value $T_I$) shows that $\tau_i$ should be decreased (see block 204) allowing the value i(t+1) to change faster. Let $S_{down} < 1$ be the downscaling factor. In one embodiment $T_I$ can be chosen 0.9 (for example) and $S_{down}$ can be chosen 0.9 (for example). Then the parameter $\tau_i$ is updated $$\tau_i := \tau_i \times S_{down} \quad (33)$$

Moreover, the filtering algorithm (19), (21)-(27) (see block 201) can be totally or partially reset according to equations (28) or (29) with $\alpha < 1$ being the parameter of the algorithm. In one embodiment $\alpha$ can be chosen $\alpha = 0.1$. The total reset is a particular case of (29) with $\alpha = 0$.

In the case of the partial reset, the current estimate i(t+1) is updated (see block 204) according to the equation $$i(t+1) := \alpha i(t+1) + (1-\alpha) i^*(t+1) \quad (34)$$

If c(t+1) is above the upper threshold value $T_u$ ($0 < T_I < T_u < 1$) then $\tau_i$ should be increased. Let $S_{up} > 1$ be the magnification factor. In one embodiment $T_u$ can be chosen 0.99 and $S_{up} = 1.1$. The parameter $\tau_i$ is updated (see block 205) according to $$\tau_i := \min\{\tau_i \times S_{up}, \tau^*\} \quad (35)$$

with updated value not exceeding the pre-defined value $\tau^*$ which can be chosen as 1200 seconds (for example).

If $T_I < c(t+1) < T_u$ then $\tau_i$ is kept unchanged.

Even if the correlation is good, the values $\|i^*(t+1)\|$ and $\|i(t+1)\|$ are not necessary nearly equal. If, for example (see block 210), the inequality $$\|i^*(t+1)\| > \|i(t+1)\| \quad (36)$$

holds for several sequential time instances (say, 5), then the value of s should be increased (see block 206):

$$s := s \times \overline{S}_{up} \quad (37)$$

Otherwise (see block 211), if the inequality $$\|i^*(t+1)\| < \|i(t+1)\| \quad (38)$$

holds for several sequential time instances (say, 5), then the value of s should be decreased (see block 207):

$$s := s \times \overline{S}_{down} \quad (39)$$

The values of $\overline{S}_{up}$ and $\overline{S}_{down}$ can be chosen 1.1 and 0.9, respectively.

Figure 3:
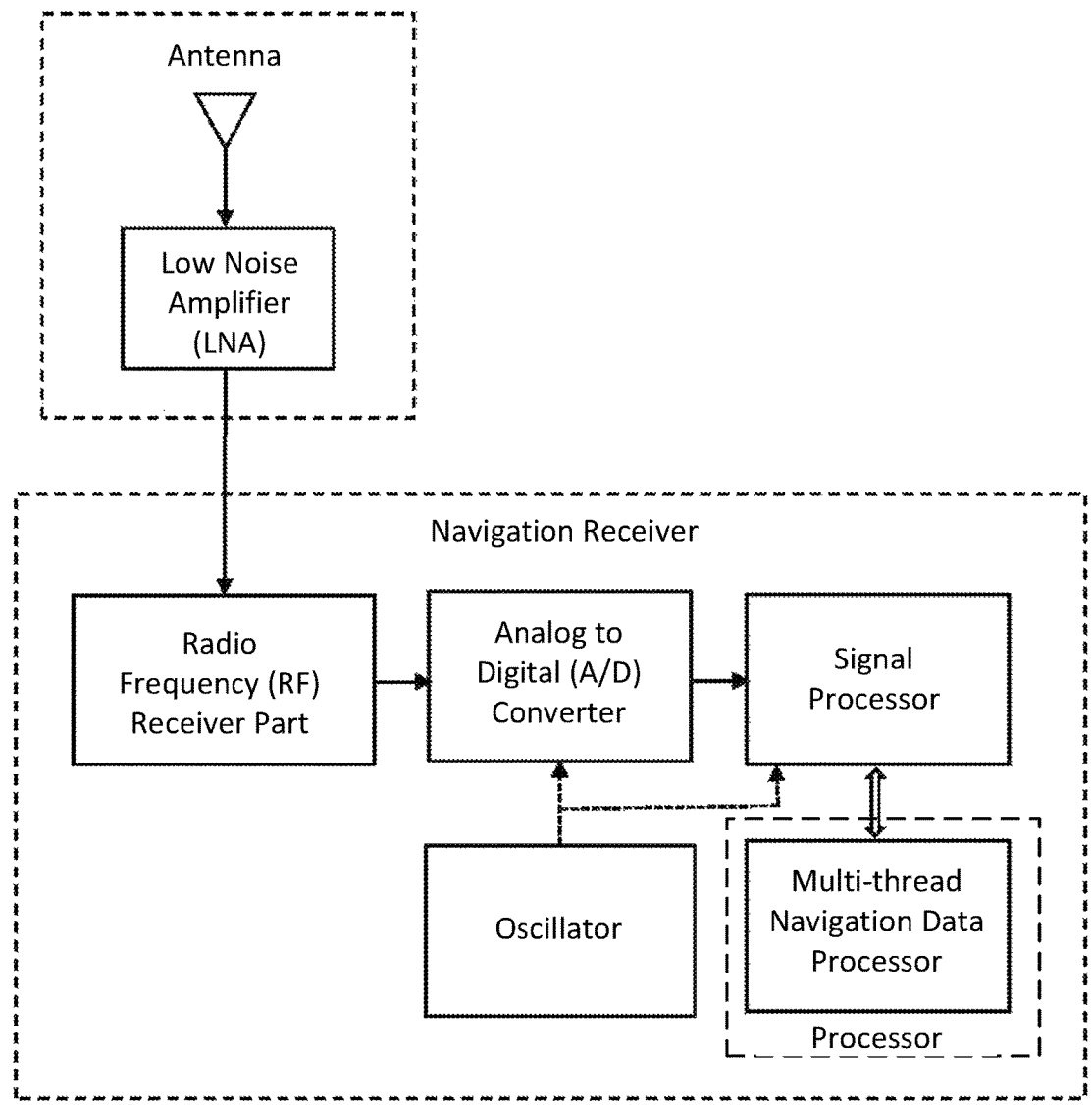
FIG. 3 illustrates an exemplary navigation receiver on which the invention may be implemented.

FIG. 3 illustrates an exemplary navigation receiver on which the invention may be implemented. As will be appreciated by one of ordinary skill in the art, the various blocks and components shown in FIG. 3 can be implemented as discrete components, as an ASIC or multiple ASICs or as software running on a processor.

Having thus described the different embodiments of a system and method, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

REFERENCES (INCORPORATED HEREIN BY
REFERENCE IN THEIR ENTIRETY)

1. A. Leick, L. Rapoport, D. Tatarnikov, *GPS Satellite Surveying*, Wiley & Sons (2015)
2. D. V. Ratnam, G. Sivavaraprasad, J. Lee, *Automatic ionospheric scintillation detector for global navigation satellite system receivers*, IET Radar, Sonar & navigation, DOI: 10.1049/iet-rsn.2014.0232 (February 2015).
3. S.V. Averin, R.A. Nevzorov, A.V. Plenkin, V.I. Zubinsky, *Mitigation of scintillations in signals of global navigation satellite systems caused by ionospheric irregularities*, U.S. Pat. No. 9,244,174, issued Jan. 26, 2016.

What is claimed is:

1. A satellite navigation positioning method, comprising:
    receiving n navigation signals from K navigation satellites, wherein the n navigation signals are on at least two different carrier frequencies, and wherein n is at least 8 and K is at least 4;
    on a processor of a navigation receiver, calculating current coordinates based on the n navigation signals;
    executing an adaptive positioning algorithm for adjusting parameter z representing a time constant of a rate of variation of ionospheric delay, and a scale factor s, which ranges from 1 to 10 and which relates to a baseline length and solar activity; and
    correcting the calculated current coordinates based on the adaptive positioning algorithm.

2. The method of claim 1, further comprising calculating a filtered estimate i(t+1) using parameters $\tau_i$ and s.

3. The method of claim 2, further comprising calculating an instant estimate i*(t+1) calculated based on instant carrier phase measurements and instant carrier phase ambiguity estimate.

4. The method of claim 3, further comprising reducing $\tau_i$ if the correlation coefficient is less than a threshold value $T_l$.

5. The method of claim 3, further comprising increasing $\tau_i$ if the correlation coefficient is greater than a threshold value $T_l$.

6. The method of claim 2, further comprising calculating a correlation coefficient $$c(t+1) = \frac{\langle i(t+1), i^*(t+1) \rangle}{\|i(t+1)\| \|i^*(t+1)\|}.$$

7. The method of claim 1, further comprising increasing s if $$\|i^*(t+1)\| > \|i(t+1)\|$$

is true for five sequential time instances.

8. The method of claim 1, further comprising decreasing s if $$\|i^*(t+1)\| < \|i(t+1)\|$$

is true for five sequential time instances.

* * * * *